(12) United States Patent
Bertsch et al.

(10) Patent No.: US 9,132,855 B2
(45) Date of Patent: Sep. 15, 2015

(54) ELECTRONIC TAG ALONG

(71) Applicant: Clark Equipment Company, West Fargo, ND (US)

(72) Inventors: Brady J. Bertsch, Wahpeton, ND (US);
Jason L. Magnuson, Fargo, ND (US);
Christopher L. Young, Fargo, ND (US);
John M. Hoaby, Lisbon, ND (US);
Charles P. Hoaby, Wahpeton, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 13/730,154

(22) Filed: Dec. 28, 2012

(65) Prior Publication Data
US 2013/0173117 A1 Jul. 4, 2013

Related U.S. Application Data

(60) Provisional application No. 61/581,429, filed on Dec. 29, 2011.

(51) Int. Cl.
*B62D 11/00* (2006.01)
*B62D 11/04* (2006.01)
(Continued)

(52) U.S. Cl.
CPC .............. *B62D 11/003* (2013.01); *B62D 11/04* (2013.01); *E02F 9/2012* (2013.01); *E02F 9/225* (2013.01); *G05G 13/00* (2013.01)

(58) Field of Classification Search
CPC ........ B62D 11/00; B62D 11/003; B60G 3/12; F16H 61/46

USPC .............................. 701/41; 280/124; 180/6.48
See application file for complete search history.

(56) References Cited

U.S. PATENT DOCUMENTS 3,891,042 A 6/1975 Braun
4,015,679 A * 4/1977 Klitz ............................ 180/305
(Continued)

FOREIGN PATENT DOCUMENTS

EP 1911891 A2 4/2008
WO 0227217 A1 4/2002
WO 0246856 A1 6/2002

OTHER PUBLICATIONS

Search Report and Written Opinion dated May 16, 2013 for International Application No. PCT/US2012/072062, filed Dec. 28, 2012, 10 pages.

*Primary Examiner* — Calvin Cheung
*Assistant Examiner* — Martin Weeks
(74) *Attorney, Agent, or Firm* — John D. Veldhuis-Kroeze; Westman, Champlin & Koehler, P.A.

(57) ABSTRACT

Disclosed embodiments include power machines that provide an electronic tag along mode of operation. A control system is coupled to and selectively provides power to the left and right side tractive elements from the power source. First and second user input devices each provide an actuation signal indicative of manipulation between a neutral state and a forward state. An electronic tag-along input device provides a tag-along activation signal. When each of the first and second user input devices are in the forward state and the electronic tag-along input device provides a tag-along activation signal, a controller maintains power to the left and right side tractive elements when one of the first and second user input devices is in the forward state and the other of the first and second user input devices is the forward or neutral state.

18 Claims, 9 Drawing Sheets

(51) Int. Cl.
*E02F 9/20* (2006.01)
*E02F 9/22* (2006.01)
*G05G 13/00* (2006.01)

(56) References Cited

U.S. PATENT DOCUMENTS

| | | | |
|---|---|---|---|
| 5,553,992 | A | 9/1996 | Ashcroft |
| 5,562,175 | A | 10/1996 | Bjorsne et al. |
| 5,566,586 | A | 10/1996 | Lauer et al. |
| 5,845,735 | A | 12/1998 | Muller et al. |
| 6,289,273 | B1 * | 9/2001 | Boettiger et al. ............... 701/96 |
| 6,523,636 | B2 | 2/2003 | Chatterjea |
| 6,550,562 | B2 | 4/2003 | Brandt et al. |
| 6,585,073 | B2 | 7/2003 | Lorenz |
| 6,863,144 | B2 | 3/2005 | Brandt et al. |
| 6,932,183 | B2 | 8/2005 | Jeppe et al. |
| 7,036,248 | B2 | 5/2006 | Meyeres et al. |
| 7,328,955 | B2 * | 2/2008 | Tsukasaki ..................... 303/190 |
| 7,334,658 | B2 | 2/2008 | Berg et al. |
| 2003/0037985 | A1 | 2/2003 | Jeppe et al. |
| 2003/0116936 | A1 | 6/2003 | Felsing et al. |
| 2003/0125859 | A1 * | 7/2003 | Dix et al. ........................ 701/50 |
| 2007/0240928 | A1 | 10/2007 | Coltson et al. |
| 2011/0202212 | A1 * | 8/2011 | Gatten et al. ..................... 701/22 |

* cited by examiner

ELECTRONIC TAG ALONG

CROSS-REFERENCE TO RELATED APPLICATION

This application claims the benefit of U.S. Provisional Patent Application 61/581,429 filed on Dec. 29, 2011, the contents of which are incorporated by reference into this application in their entirety.

FIELD

Disclosed embodiments relate to power machines such as compact loaders, excavators, material handlers, utility vehicles, and the like that utilize electronic joysticks or similar steering control devices for driving the machine.

BACKGROUND

Power machines such as skid-steer loaders, tracked loaders, and the like are traditionally steered by an operator through the use of a pair of manipulable drive control levers, each of which are mechanically coupled to one of two drive pumps. The two drive pumps are provided to control tractive effort on the left and right sides of the machine. Manipulating the two levers controls both the speed and direction of the power machine. When an operator wishes to drive the machine straight forward, both of the drive control levers are pushed forward an equal amount.

When such a power machine is being moved over a long distance, it is often desirable to remove one hand from one of the levers to perform various tasks. It is known that a so-called "tag along" mechanism can be provided in such a power machine to allow an operator to release one of the levers while driving straight forward and have the power machine maintain a straight and forward path of travel. The released control lever itself is urged by the mechanism to remain in the driving position (i.e. tag along) until the operator manipulates either of the drive control levers.

As discussed above, some power machines employ joystick control devices, which provide electrical signals to an electronic drive system, which in turn controls the drive pumps. Conventional joystick devices are spring loaded to a center or neutral position and do not have a tag along mechanism to maintain the joystick in a forward position if released by the operator. Thus, to maintain a straight and forward path of travel, it is necessary to physically actuate both of the joystick devices during the entire travel event.

The discussion above is merely provided for general background information and is not intended to be used as an aid in determining the scope of the claimed subject matter.

SUMMARY

Disclosed embodiments include power machines configured to provide an electronic tag along mode of operation for skid-steer loaders and other types of machines that use a pair of joystick controllers, steering lever controllers, or similar electronic operator inputs to control directional travel of the machine. In one embodiment a power machine having a power source and separately controllable left and right side tractive elements for affecting enabling travel of the power machine is disclosed. The power machine includes a control system coupled to the power source and to the left and right side tractive elements for selectively providing power from the power source to the left and right side tractive elements. First and second user input devices are each capable of providing an actuation signal indicative of manipulation between a neutral state and a forward state. A manipulable electronic tag-along input device is configured to provide a tag-along activation signal. A controller is in communication with the first and second user input devices, the electronic tag-along input device, and the control system. When each of the actuation signals of first and second user input devices indicate manipulation to the forward state and the electronic tag-along input device provides a tag-along activation signal, the controller signals the control system to maintain provision of power to the left and right side tractive elements when one of the first and second user input devices is in the forward state and the other of the first and second user input devices is in one of the forward state and the neutral state.

In another embodiment, a power machine having an engine, separately controllable left and right side tractive elements for affecting travel of the power machine, and left and right drive motors configured to provide power to the left and right side tractive elements is disclosed. The power machine includes a control system coupled to the power source and to the left and right drive motors for controlling application of power from the power source to the left and right drive motors to affect travel of the power machine. First and second user input devices manipulable by a user can be moved forward and rearward of a neutral position to respectively control application of power to the left and right drive motors and thereby to the left and right side tractive elements. An electronic tag along input device activates a tag along mode of operation when actuated. A controller is coupled to the first and second user input devices and to the control system. When both of the first and second user input devices manipulated into forward driving positions, the tag along mode is activated using the electronic tag along engaging input device, the controller controls the control system to maintain the power machine moving in the forward direction when one of the first and second user input devices is returned to the neutral position.

In yet another embodiment, a method of operating a power machine having left and right side tractive elements which are separately controllable using first and second electronic user input devices is disclosed. The method includes moving both of the first and second electronic user input devices to forward driving positions to cause the power machine to move in a forward direction, An electronic tag along mode of operation while the power machine is moving in the forward direction is engaged. The first electronic user input device released from the forward driving position to a neutral position while maintaining the second electronic user input device in the forward driving position and forward movement of the power machine is maintained in the forward driving position and the electronic tag along mode of operation remains engaged.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5-1 through 5-4 are diagrammatic illustrations of operational positions of the joystick portions of the operator input devices of FIG. 4 in a tag along mode of operation.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Disclosed embodiments provide an electronic tag along feature for skid-steer loaders and other types of power machines that use a pair of operator input devices to control the propulsion and/or steering of the power machine. Some examples of operator input devices include joystick inputs or steering lever inputs, although any other type of actuable operator inputs, such as levers, switches, buttons, and the like to control directional travel of the machine can be employed, such that under normal operation an operator is typically compelled to operate at least one of the operator input devices with each hand. When engaged, the electronic tag along feature allows the operator to physically release one of the input devices while maintaining the direction and speed of travel of the power machine. When physically released, the input device can automatically return to its default center or neutral position while allowing the power machine to maintain its direction and speed of travel under the control of the other input device under certain conditions, described in the illustrative embodiments discussed below.

Figure 1:
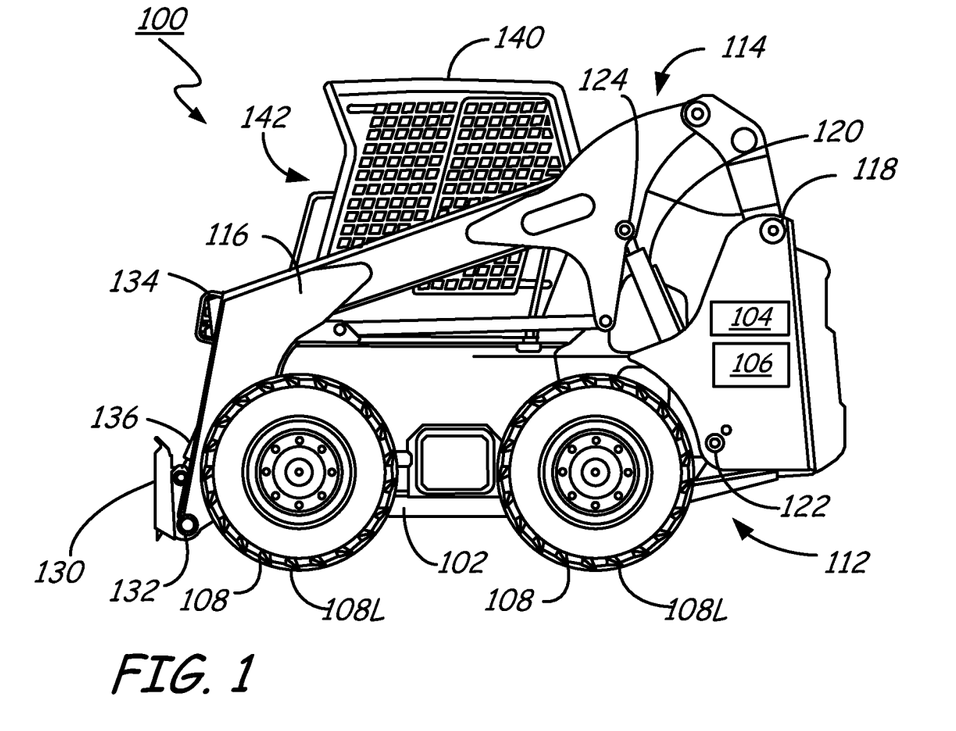
FIG. 1 is a side view of a skid-steer loader embodiment of a power machine configured to implement electronic tag along features.

FIG. 1 is a side view of a representative power machine 100 upon which the disclosed embodiments can be employed. The power machine 100 illustrated in FIG. 1 is a skid-loader, but other types of power machines such as tracked loaders, steerable wheeled loaders, including all-wheel steer loaders, excavators, and utility vehicles, to name but a few examples, may employ the disclosed embodiments. The power machine 100 includes a supporting frame or main frame 102, which supports a power source 104, which in some embodiments is an internal combustion engine. A control system 106 is operably coupled to the power source 104. Control system 106 illustratively receives power from the power source 104 and operator inputs to convert the received power to signals that operate functional components of the power machine. In some embodiments, such as with the power machine 100 in FIG. 1, the control system 106 includes hydraulic components such as one or more hydraulic pumps that are configured to provide pressurized hydraulic fluid to various actuators and valve components that are illustratively employed to control the flow of hydraulic fluid to some or all of the actuators used to control functional components of the power machine 100. Other types of control systems are contemplated. For example, the control system 106 can include electric generators or the like to generate electrical control signals to power electric actuators. For the sake of simplicity, the actuators disclosed herein are referred to as hydraulic or electrohydraulic actuators, but other types of actuators can be employed in some embodiments.

Among the function components that are capable of receiving signals from the control system 106 include tractive elements 108, illustratively shown as wheels, which are configured to rotatably engage a support surface to cause the power machine to travel. The power machine 100 shown FIG. 1 has a pair of wheels 108L on the left side 112 and a pair of wheels on the right side 108R (not shown in FIG. 1, but diagrammed in FIG. 3) of the power machine 100. Other examples of power machines can have tracks or other tractive elements instead of wheels. In the illustrative embodiment, a pair of hydraulic motors (not shown in FIG. 1, are provided to convert a hydraulic power signal into a rotational output. In power machines such as skid-steer loaders, a single hydraulic motor is coupled to both of the wheels on one side of the power machine. Alternatively, a hydraulic motor can be provided for each tractive element in a machine. In a skid-steer loader, steering is accomplished by providing unequal rotational outputs to the tractive element or elements on one side of the machine as opposed to the other side. In some power machines, steering is accomplished through other means, such as, for example, steerable axles.

The power machine 100 also includes a lift arm assembly 114 that is capable of being raised and lowered with respect to the frame 102. The lift arm assembly 114 illustratively includes a lift arm 116 that is pivotally attached to the frame 102 at attachment point 118. An actuator 120, which in some embodiments is a hydraulic cylinder configured to receive pressurized fluid from control system 106, is pivotally attached to both the frame 102 and the lift arm 116 at attachment points 122 and 124, respectively. The lift arm 116 is representative of the type of lift arm that may be attached to the power machine 100. It should be appreciated that the lift arm assembly 114 shown in FIG. 1 includes a second lift arm and actuator disposed on an opposite side of the of the power machine 100, although neither is shown in FIG. 1. It should be appreciated further that other lift arm assemblies, with different geometries and structures can be attached to the power machine 100 without departing from the scope of the present discussion.

An implement carrier 130 is pivotally attached to the lift arm 116 at attachment point 132. One or more actuators such as hydraulic tilt cylinder 136 are pivotally attached to the implement carrier and the lift arm assembly 114 to cause the implement carrier to rotate under power about an axis that extends through the attachment point 132 in response to operator input. In some embodiments, the one or more actuators pivotally attached to the implement carrier and the lift arm assembly are hydraulic cylinders capable of receiving pressurized hydraulic fluid from the control system 106. The implement carrier 130 is configured to accept and secure any one of a number of different implements to the power machine as may be desired to accomplish a particular work task. The power machine 100 provides a source 134 of power and control signals that can be coupled to an implement to control various functions on the implement, in response to operator inputs.

Power machine 100 also illustratively includes a cab 140, which is supported by the frame 102. Cab 140 defines, at least in part, an operator compartment 142. Operator compartment 142 typically includes an operator seat (not shown in FIG. 1) and operator input devices (not shown in FIG. 1) accessible from a sitting position in the seat. When an operator is seated properly within the operator compartment, the operator can manipulate operator input devices to control such functions as driving the power machine 100, raising and lowering the lift arm assembly 114, rotating the implement carrier 130 about the lift arm assembly 114 and make power and control signals available to an implement at source 134. The signals provided at source 134 illustratively include electrical and hydraulic signals, which can be provided to electrical, electronic, and hydraulic devices on a particular implement.

In some embodiments, an electronic controller 150 (shown in FIG. 3) is configured to receive input signals from operator input devices and provide control signals to the control system 106. It should be appreciated that electronic controller 150 can be a single electronic control device with instructions stored in a memory device and a processor that reads and executes the instructions to receive input signals and provide output signals all contained within a single enclosure. Alternatively, the electronic controller 150 can be implemented as a plurality of electronic devices, coupled together on a network. The disclosed embodiments are not limited to any single implementation of an electronic control device or devices.

Figure 2:
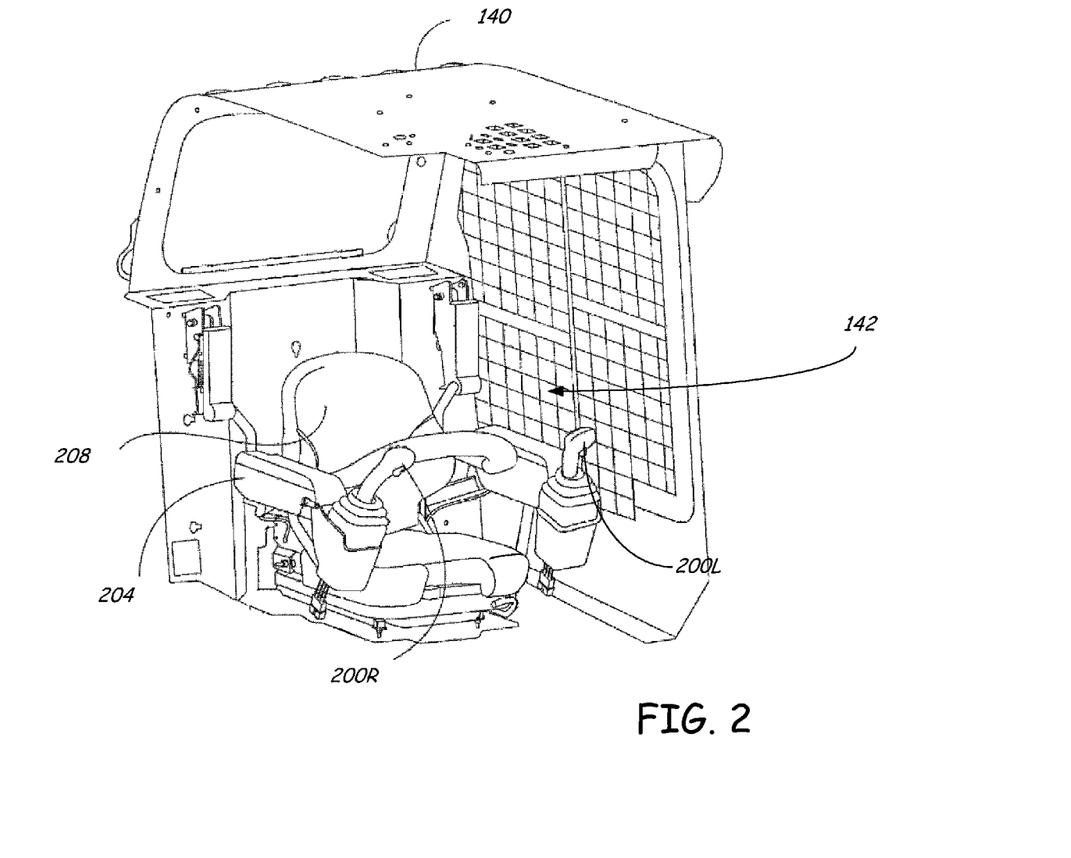
FIG. 2 is a perspective view of an interior of an exemplary operator compartment of the power machine of FIG. 1 showing a pair of operator input devices with joysticks for controlling the speed and direction of travel of the power machine.

Referring now to FIG. 2, shown is diagrammatic view of portions of operator compartment 142 illustrating exemplary positioning of left and right operator input devices 200L and 200R used by an operator of power machine 100 to independently control the left and right side tractive elements 108 of the power machine. In this particular exemplary embodiment, left and right operator inputs 200L and 200R are two axis electronic joysticks coupled to armrests 204 in relation to seat 208. The operator input devices 200L and 200R are capable of providing signals indicative of variable speed travel in either a forward or reverse direction, depending on how the control inputs are manipulated by an operator.

Figure 3:
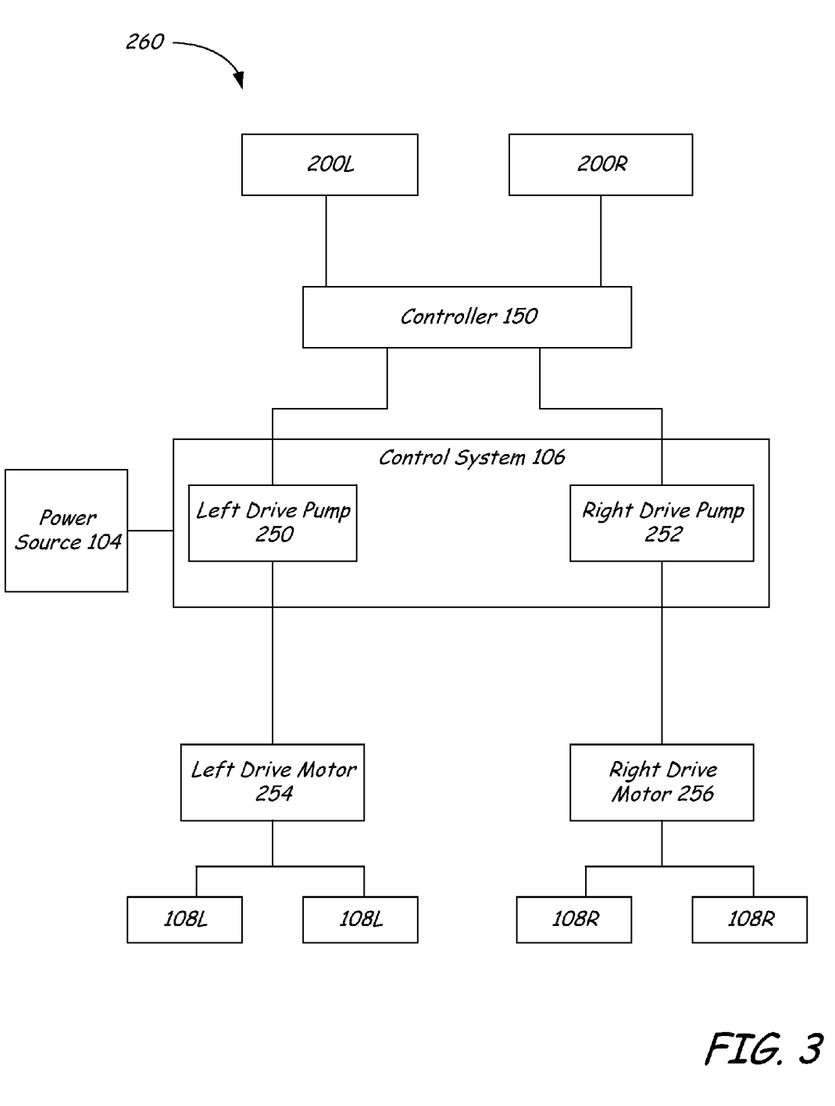
FIG. 3 is a block diagram illustrating portions of a drive system of the power machine of FIG. 1.

FIG. 3 is a schematic diagram of portions a drive system 260 for power machine 100 according to one illustrative embodiment. Left and right drive control operator inputs 200L and 200R are operatively coupled to controller 150 to provide input signals indicative of the actuation of the inputs by an operator. Controller 150, in turn, is operably connected to control system 106. More particularly, controller 150 is in communication with a pair of drive pumps, left drive pump 250 and right drive pump 252. Left and right drive pumps 250 and 252 are illustratively variable displacement pumps that are in communication with left drive motor 254 and right drive motor 256, respectively. Controller 150 illustratively provides output signals to control the left and right drive pumps 250 and 252 to provide hydraulic fluid to the left and right drive motors 254 and 256 to cause the left and right drive motors to rotate in clockwise or counterclockwise direction at a rate determined by the actuator on the drive control operator inputs 200L and 200R. Left drive motor 254 is coupled to wheels 108L and right drive motor 256 is coupled to wheels 108R. As the left drive pump 250 and the right drive pump 252 are separate pumps, it should be that left drive motor 254 and right drive motor 256 are controlled independently of one another. As such, the speed and direction of wheels 108L and 108R can differ from each other. To maintain a straightforward travel, then, it is necessary for both the wheels 108L and 108R to be rotating in the same direction at the same speed. This is normally accomplished by actuating operator inputs 200L and 200R in a similar manner. However, as discussed above, there may be times when an operator wishes to drive the machine for a period of time in a particular direction while leaving one hand free to perform other tasks. A tag along feature for operator inputs such as electronic joysticks is described below.

Figure 4:
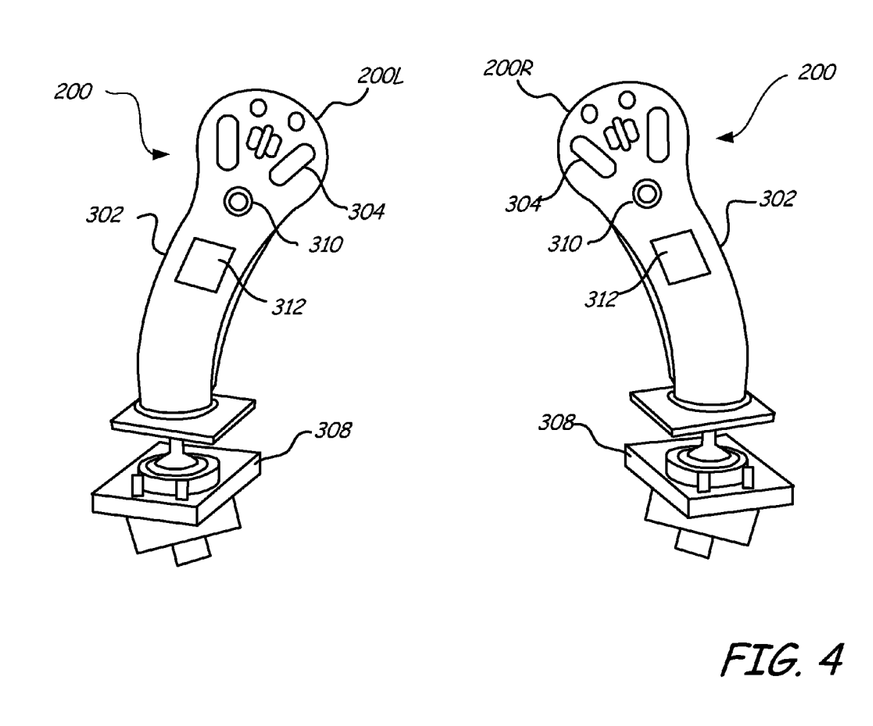
FIG. 4 is an illustration of the pair of operator input devices shown in FIG. 2, each having a joystick portion manipulable with respect to a base.

Referring now to FIG. 4, shown are exemplary embodiments of operator input devices 200 and more particularly, left and right operator input devices 200L and 200R. Each of the operator input devices 200 has an upper joystick portion 302, which is manipulable from a centered position (shown in FIG. 4) with respect to a base 308. At least one sensor (not shown) is positioned within each of the operator inputs 200L and 200R. When an operator moves the joystick portions 302 of operator inputs 200L and 200R with respect to their respective assembly bases 308, the at least one sensor provides indications of a position, motion, and/or movement of the joystick portion 302 to a joystick controller 312 illustratively located within the joystick portion of the operator input device. Alternatively, the joystick controller 312 can be located in the base 308 or in any location in close proximity to the operator input device 200. The joystick controller 312, in turn, communicates information related to the position, motion, and/or movement of the joystick portion 302 to the electronic controller 150 for further processing. Communication of information from the joystick controller 312 to the electronic controller 150 can be accomplished by transmitting messages using an established communications protocol such as controller-area-network ("CAN"), by wireless communication, or by other methods. Each operator input device 200 typically includes a plurality of buttons 304 that control a plurality of functions of the power machine 100 and/or an implement that is coupleable to the power machine by providing signals to the implement via source 134. In exemplary embodiments, one or both of the joysticks include a tag along enable operator input device 310, such as a push button or switch, which can be used to enable a tag along mode.

In accordance with exemplary embodiments, when both left and right joystick portions 302 are manipulated by an operator into a forward driving position, the tag along mode can be engaged by actuating one of the tag along enable inputs 310 and subsequently releasing one of the joysticks. In exemplary embodiments, the tag along mode is engaged by actuating the tag along input device 310 on the joystick portion to be released so that it can return to a centered position. Alternatively, the tag along mode is engaged by actuating the tag along input device 310 on the joystick that is not to be released, on either joystick, on both joysticks, or elsewhere.

Once the tag along mode is engaged, electronic drive controller 150 controls the left and right drive pumps 252, 254 such that the single operator input device that is still positioned away from a centered position will operate to control the travel speed in a straight and forward direction. Minor steering maneuvers can be accomplished using the previously released operator input device 200 by moving its handle in either a forward or reverse direction from its center neutral position. However, in some embodiments, the steering control movements cannot be more than a given threshold amount of stroke in either a forward or reverse direction. Beyond the threshold amount of stroke, joystick controller 312 and/or electronic drive controller 150 disengages the tag along mode. In some embodiments, the tag along mode can also be disabled by returning the engaged operator input device 200 to a neutral position (i.e. the engaged operator input device 200 can be used to vary speed while maintaining the tag along mode unless the engaged operator input device is returned to the neutral, centered position). In some embodiments, other intervening actions disengage the tag along mode. For example, actions such as moving the previously released joystick beyond a threshold or toggling the tag along feature off by hitting one of the tag along enable inputs can be used to disengage the tag along mode of operation.

FIGS. 5-1 through 5-4 further illustrate the positions of operator input devices 200L and 200R in exemplary operation of power machine 100, including tag along mode operation. In FIG. 5-1, joystick portions 302 of operator input devices 200L and 200R are both in center or neutral positions, designated by axes 400L and 400R, in which the power machine would typically be stationary. In FIG. 5-2, both of joystick portions 302 of operator input devices 200L and 200R have been moved forward by an operator to second positions, designed by axes 410L and 410R, which will result in forward movement of the power machine. Typically, the forward movement of power machine 100 resulting from the joysticks being moved to the second positions is a straightforward movement. With joysticks 200L and 200R in the second positions 410L and 410R, the operator can engage the electronic tag along mode by actuating one or both of tag along enable inputs 310. Enablement of the tag along mode causes electronic controller (150 of FIG. 3) to enter a tag along mode of operation.

Figure 53:
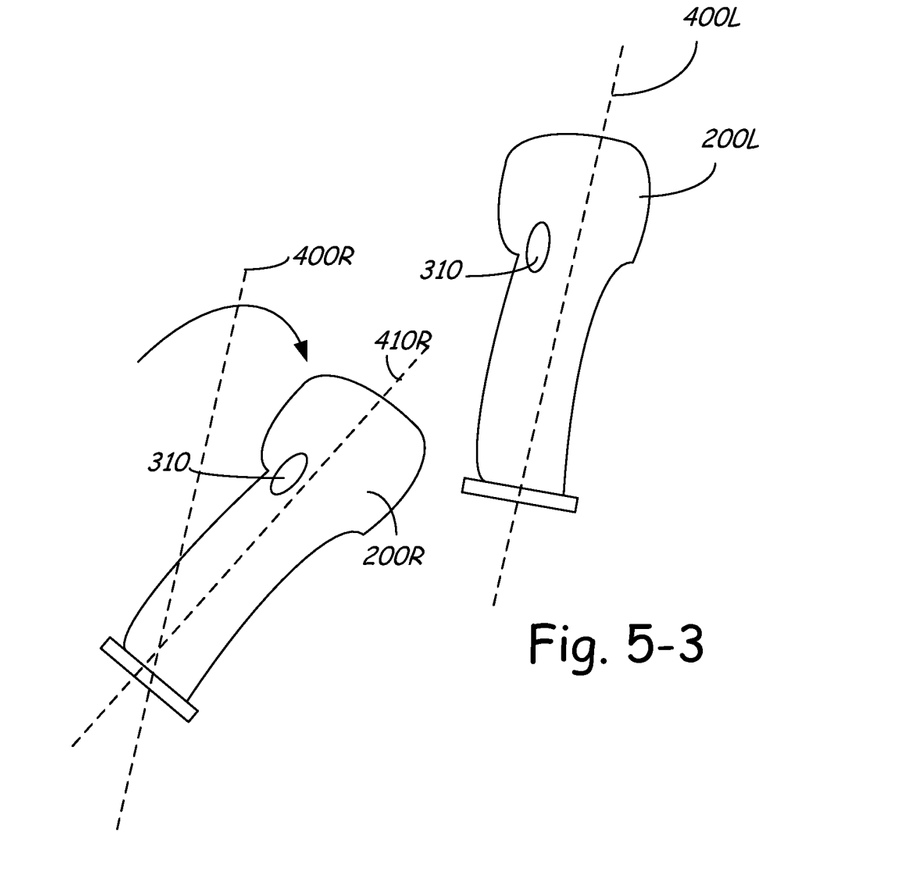
Figure 54:
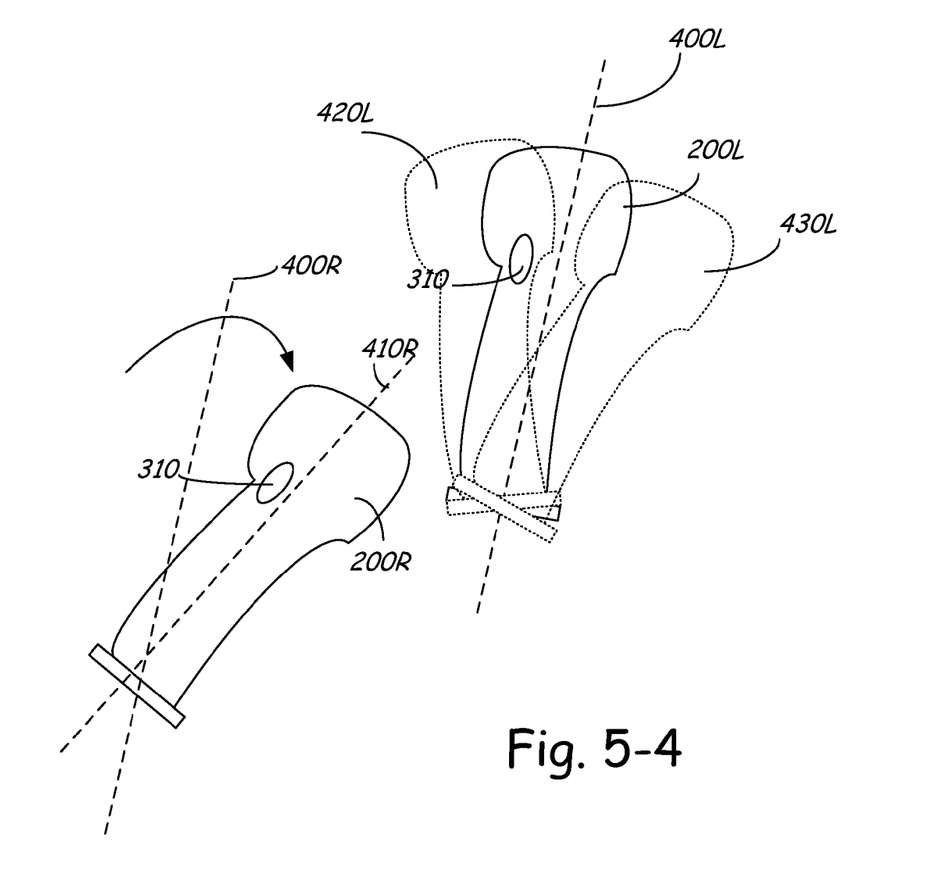

In the tag along mode of operation, one of the joysticks can be released by the operator and allowed to return to its neutral position 400L. In the example shown in FIG. 5-3, the joystick portion 302 of the operator input device 200L is released, while the joystick portion 302 of the operator input device 200R is maintained in the second position 410R. In this mode of operation, electronic controller 150 will control the left drive pump 252 to maintain the forward movement that would occur if neither joystick portion had been released. While in this mode of operation, steering maneuvers can be implemented by moving the joystick portion 302 of the operator input device 200L backward and forward of the neutral position 400L. As shown in FIG. 5-4, steering maneuvers are implemented by moving the joystick portion 302 of the operator input device 200L to rearward positions such as position 420L or forward positions such as position 430L. In an exemplary embodiment, movement of the joystick portion 302 of the operator input device 200L to rearward position 420L will cause controller 150 to lower the output of left drive pump 252 relative to the output of right drive pump 254 to cause a slight left turning movement of the power machine. Similarly, movement of the joystick portion 302 of the operator input device 200L to forward position 430L will cause controller 150 to increase the output of left drive pump 252 relative to the output of right drive pump 254 to cause a slight right turning movement of the power machine. Similarly, if the joystick portion 302 of the operator input device 200R had been released from forward position 410R and the joystick portion 302 of the operator input device 200L had been maintained in forward position 410L at the initiation of the tag along mode, slight forward and rearward movement of the joystick portion 302 of the operator input device 200R could be used to implement similar, but opposite steering maneuvers.

Figure 6:
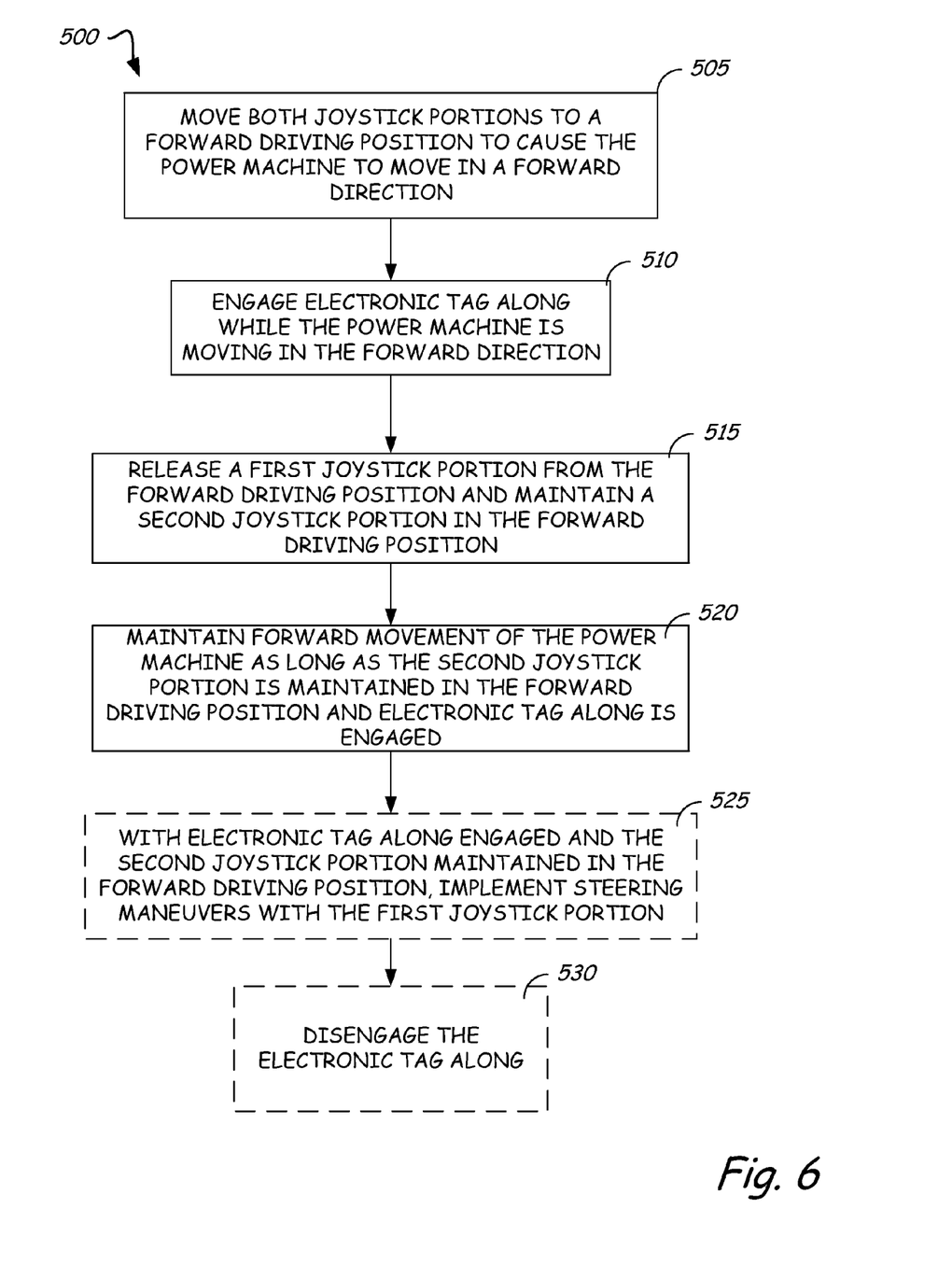
FIG. 6 is a flow diagram illustrating a disclosed method embodiment.
Figure 51:
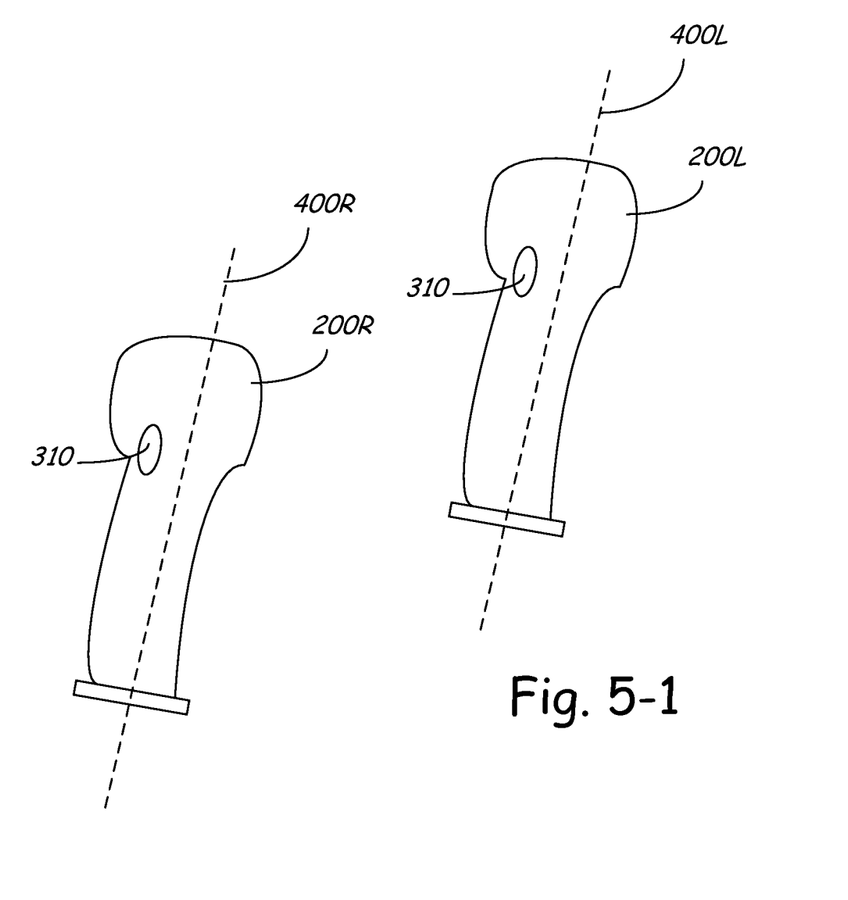
Figure 52:
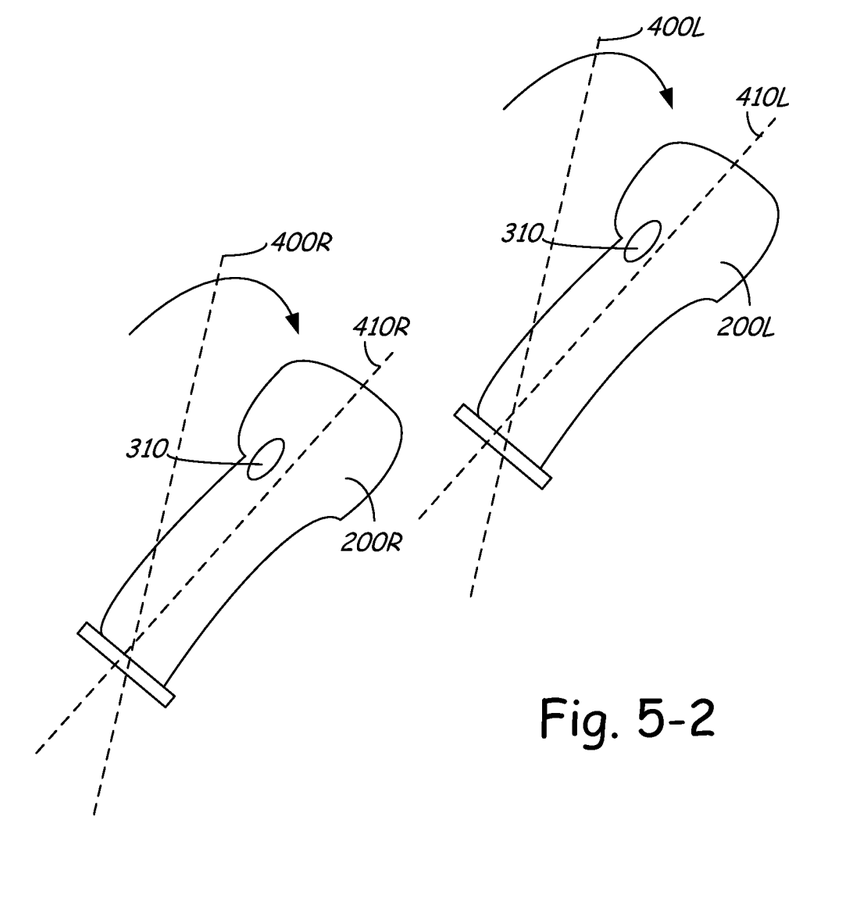

Referring now to FIG. 6, shown is a method 500 of controlling a power machine in accordance with exemplary embodiments as discussed above. As shown at step 505, both electronic joysticks 200L and 200R are moved to a forward driving position (e.g., as shown in FIG. 5-2) to cause the power machine to move in a forward direction. In exemplary embodiments, both joysticks are moved forward by substantially the same distance and the resulting forward motion is a substantially straight forward motion. Next, as shown at step 510, the electronic tag along mode is engaged while the power machine is moving in the forward direction. In exemplary embodiments, the electronic tag along mode is engaged using an operator input 310 positioned on the respective joysticks. However, other methods of engaging the electronic tag along mode can also be used.

Next, as shown at step 515, the method includes releasing a first joystick from the forward driving position and maintaining a second joystick in the forward driving position. This is illustrated for example in FIG. 5-3. As long as the electronic tag along is engaged and the second joystick is maintained in the forward driving position, forward movement of the power machine is maintained as shown at step 520 in FIG. 6. Optionally, the method also includes the step 525 of implementing steering maneuvers with the first joystick while the electronic tag along is engaged and the second joystick is maintained in the forward driving position. This is illustrated for example in FIG. 5-4. As shown at step 530, the electronic tag along mode of operation can be disengaged, for example using any of the methods described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, different types of power machines can include hydraulic systems having one or more of the disclosed concepts. Other examples of modifications of the disclosed concepts are also possible, without departing from the scope of the disclosed concepts.

What is claimed is:

1. A power machine having a power source and separately controllable left and right side tractive elements for enabling travel of the power machine, the power machine comprising:

a control system coupled to the power source and to the left and right side tractive elements, the control system configured to selectively provide power from the power source to the left and right side tractive elements;

first and second user input devices configured to provide an actuation signal indicative of manipulation between a neutral state and a forward state;

a manipulable electronic tag-along input device configured to provide a tag-along activation signal; and a controller in communication with the first and second user input devices, the electronic tag-along input device, and the control system, and configured to control the left and right side tractive elements in a regular mode and in a tag-along mode, wherein in the regular mode, the controller signals the control system to control the left side tractive element responsive to actuation of one of the first and second user input devices and signals the control system to control the right side tractive element based on actuation of the other of the first and second user input devices;

wherein in the tag-along mode, the controller signals the control system to control both the left and right side tractive elements responsive to actuation of the first user input device; and wherein the controller enters the tag-along mode from the regular mode when each of the actuation signals of the first and second user input devices indicate manipulation to the forward state and the electronic tag-along input device provides a tag-along activation signal and the second user input device is moved so that its actuation signal indicates manipulation to the neutral state.

2. The power machine of claim 1, and further comprising left and right side drive motors respectively coupled between the control system and the left and right side tractive elements.

3. The power machine of claim 1, wherein the controller is configured to enter the tag-along mode only if, upon actuation of the tag-along input device, the forward positions of the first and second user input devices are such that the forward direction in which the power machine is moving is a substantially straight forward direction.

4. The power machine of claim 1, wherein the controller is configured such that, while in the tag-along mode, the controller controls the control system to implement travel adjustment steering maneuvers in response to the second user input device being moved by the user in a forward or reverse direction from its neutral position.

5. The power machine of claim 4, wherein the controller is configured such that, while in tag-along mode, moving the second user input device in the forward or reverse direction from its neutral position by more than a threshold amount causes the tag-along mode to be disengaged.

6. The power machine of claim 4, wherein the controller is configured such that, while in tag-along mode, the tag-along mode is disengaged using the electronic tag-along input device.

7. A power machine having a power source, separately controllable left and right side tractive elements for affecting travel of the power machine, and left and right drive motors configured to provide power to the left and right side tractive elements, the power machine comprising:
  a control system coupled to the power source and to the left and right drive motors, the control system configured to control application of power from the power source to the left and right drive motors to affect travel of the power machine;
  first and second user input devices manipulable by a user to be moved forward and rearward of a neutral position;
  an electronic tag-along engaging input device that activates a tag-along mode of operation when actuated; and
  a controller coupled to the first and second user input devices and to the control system, wherein the controller is configured to operate in a regular mode and the tag-along mode;
  wherein in the regular mode, the controller controls application of power to the left and right drive motors in response to manipulation of the first and second user input devices, respectively;
  wherein in the tag-along mode, the controller controls the control system to maintain the power machine moving in the forward direction, when one of the first and second user input devices is released to the neutral position, in response to manipulation of the other of the first and second user input devices; and
  wherein the tag-along mode is activated in response to activation of the electronic tag-along engaging input device.

8. The power machine of claim 7, wherein the controller is configured to enter the tag-along mode upon actuation of the electronic tag-along engaging input device only when the first and second user input devices are manipulated such that the power machine is moving in a substantially straight forward direction.

9. The power machine of claim 8, wherein the controller is configured such that, while in the tag-along mode, the controller controls the control system to implement travel adjustment steering maneuvers in response to the released one of the first and second user input devices being moved by the user in a forward or reverse direction from its neutral position.

10. The power machine of claim 9, wherein the control system includes a left drive pump coupled to the left drive motor and a right drive pump coupled to the right drive motor, and wherein movement of the released one of the first and second user input devices in a reverse direction from its neutral position causes the controller to lower an output of the corresponding left or right drive pump relative to the other of the left or right drive pump to cause a turning movement of the power machine in a first direction, and wherein movement of the released one of the first and second user input devices in a forward direction from its neutral position causes the controller to increase an output of the corresponding left or right drive pump relative to the other of the left or right drive pump to cause a turning movement of the power machine in a second direction.

11. The power machine of claim 9, wherein the controller is configured such that, while in tag-along mode, moving the released one of the first and second user input devices in the forward or reverse direction from its neutral position by more than a threshold amount causes the tag-along mode to be disengaged.

12. The power machine of claim 9, wherein the controller is configured such that, while in tag-along mode, the tag-along mode is disengaged using the electronic tag-along engaging input device.

13. The power machine of claim 9, wherein the controller is configured such that, while in tag-along mode, moving the non-released one of the first and second user input devices back to its neutral position causes the tag-along mode to be disengaged.

14. A method of operating a power machine having a controller that provides control signals to control left and right side tractive elements which are separately controllable in a regular mode using first and second electronic user input devices, the method comprising:
  moving both of the first and second electronic user input devices to forward driving positions to cause the power machine to move in a forward direction;
  activating a tag-along mode in the controller by:
    engaging an electronic tag-along mode of operation while the power machine is moving in the forward direction, and
    releasing the first electronic user input device from the forward driving position to a neutral position while maintaining the second electronic user input device in the forward driving position; and
  wherein in the tag-along mode, the controller provides control signals to maintain straight forward movement of the power machine in response to actuation of the second electronic user input device while the first electronic user input device is in the neutral position.

15. The method of claim 14, wherein the controller implements steering maneuvers in response to actuation of the first electronic user input device away from the neutral position while the electronic tag-along mode of operation is activated.

16. The method of claim 15, wherein the controller implements steering maneuvers in response to actuation of the first electronic user input device forward or rearward of the neutral position.

17. The method of claim 16, wherein the controller deactivates the electronic tag-along mode of operation when the first electronic user input device is moved forward or rearward of the neutral position by more than a threshold amount.

18. The method of claim 16, wherein the controller deactivates the electronic tag-along mode of operation when the second electronic user input device is released back to its neutral position.

* * * * *